Nov. 23, 1965 K. H. LANGE 3,218,946
REMOVABLE PRISM VIEWFINDER UNIT FOR REFLEX CAMERA WITH
REFLECTING MEANS FOR VIEWING EXPOSURE METER
Filed Nov. 2, 1960 3 Sheets-Sheet 1

INVENTOR:
KARL HEINZ LANGE

By MAXWELL E. SPARROW
Attorney

Nov. 23, 1965    K. H. LANGE    3,218,946
REMOVABLE PRISM VIEWFINDER UNIT FOR REFLEX CAMERA WITH
REFLECTING MEANS FOR VIEWING EXPOSURE METER
Filed Nov. 2, 1960    3 Sheets-Sheet 2

INVENTOR:

KARL HEINZ LANGE

By MAXWELL E. SPARROW

Attorney

Nov. 23, 1965 K. H. LANGE 3,218,946
REMOVABLE PRISM VIEWFINDER UNIT FOR REFLEX CAMERA WITH
REFLECTING MEANS FOR VIEWING EXPOSURE METER
Filed Nov. 2, 1960 3 Sheets-Sheet 3

INVENTOR:

KARL HEINZ LANGE

By

MAXWELL E. SPARROW

Attorney

United States Patent Office 3,218,946
Patented Nov. 23, 1965

3,218,946
REMOVABLE PRISM VIEWFINDER UNIT FOR REFLEX CAMERA WITH REFLECTING MEANS FOR VIEWING EXPOSURE METER
Karl Heinz Lange, Bunde-Ennigloch, Westphalia, Germany, assignor to Rudolf Gruter, Wilhelm Mexner, and Arnold Nolte, trading as Balda-Kamerawerk Rudolf Gruter Kommanditgesellschaft, Bunde, Westphalia, Germany
Filed Nov. 2, 1960, Ser. No. 66,833
Claims priority, application Germany, Nov. 24, 1959, B 55,655
3 Claims. (Cl. 95—10)

The invention relates to an arrangement permitting the simultaneous observation of a viewfinder picture, particularly the viewfinder picture of a reflex camera with a penta roof-edge prism, and of an exposure meter installed in the camera. Viewfinders with penta roof-edge prisms are known per se. Hitherto, however, there was no advantageous way of providing such a view-finder with a reflected image of the exposure meter needle without passing the exposure meter rays through the roof-edge prism. The object of the invention is to solve this problem. To this end, according to the invention, one edge of the aperture limiting the eyepiece opening of the viewfinder is formed by the edge of a reflector surface and the image of an exposure meter needle and of a follow-up needle, or of a scale, is reflected beside or into the viewfinder field by means of said reflector surface and at least one other reflector surface. The new viewfinder is preferably interchangeable. Without departing from the principle of the invention, however, the penta roof-edge prism may be rigidly installed in the reflex camera, but interchangeability of the prism in conjunction with the present innovation affords certain advantages. If, for example, the prism insert is replaced by a simple light-conducting shaft insert, the user of the camera again finds the exposure meter scale at the point from which he observes the viewfinder image, namely at the top of the camera. If the prism viewfinder is used instead of this, then a mirror system connected to the prism viewfinder shows the exposure meter scale in a sharply defined and brightly lit form in transmitted light next to the ground glass image viewed through the penta roof-edge prism.

In contrast to known systems, in the present case neither the complete penta roof-edge prism nor part thereof is traversed by the rays originating from the exposure meter scale. This has the decided advantages that the penta-prism may be a standard construction and it is not necessary to carry out any complicated process of cementing other prisms on in order to deflect a beam of rays out of the pentaprism. Nor need the penta roof-edge prism in the present case be enlarged by the width of the scale, so that here again there is a saving in cost. For the purpose of attaching it to the camera, the prism viewfinder may be inserted or engaged in the recess provided for the purpose, both from the top and, in the case of the exemplified embodiment, from the rear wall of the camera.

The present invention gives complete freedom of choice with regard to the fastening of the prism viewfinder in the camera.

The invention is explained in greater detail with reference to the drawings, wherein.

Figure 1:
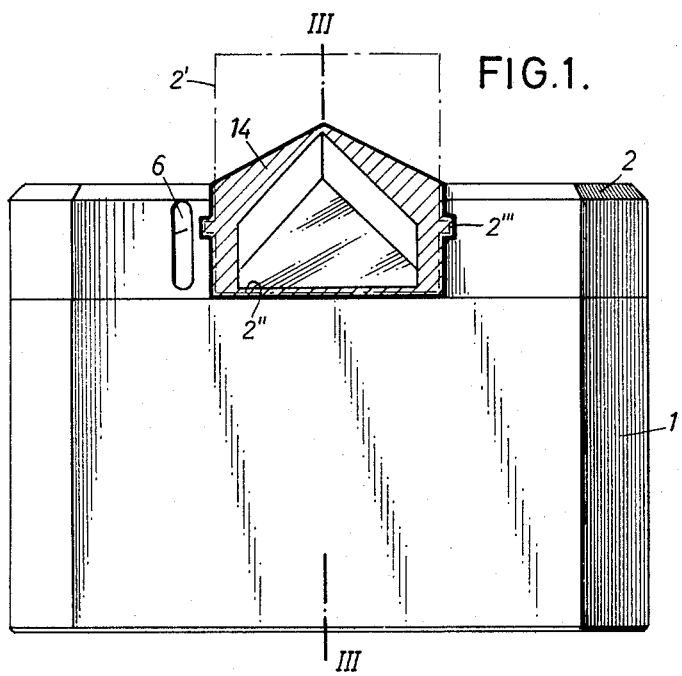
FIG. 1 is a view of the camera from the rear wall thereof, with the prism viewfinder inserted, the housing of said viewfinder being shown in section on the line I—I in FIG. 2.

In the drawings, reference 1 denotes the camera housing, reference 2 the camera top and 3 the cut-out for the direct observation of the exposure meter needle 3' from the top of the camera. Reference 4 is a mirror, which is preferably installed in the exposure meter housing in such manner as to be dust-proof, and which reflects the image of the exposure meter scale or exposure meter needle 3' (not shown here) out of a rear aperture 6 in the camera top 2 by way of a compensating lens 5 which may be necessary in some cases. References 7 and 8 denote protective windows in the camera top 2 to cover the apertures 3 and 6. These protective windows may be formed by the exposure meter housing itself if a transparent plastic material is used for said housing.

Figure 3:
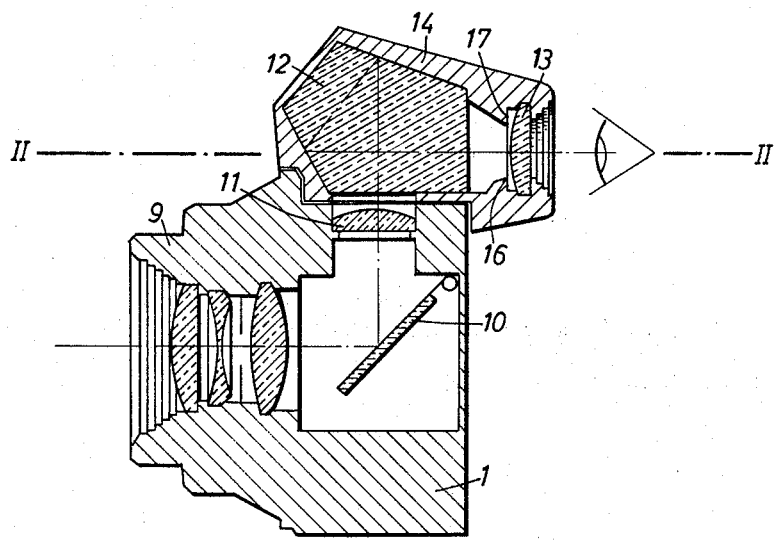
FIG. 3 is a central section on the line III—III in FIGS. 1 and 2 through the reflex camera with the viewfinder inserted.
Figure 4:
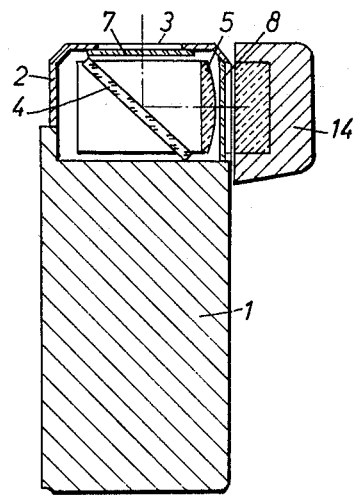
FIG. 4 is a section on the line IV—IV in FIG. 2 through the camera housing and the viewfinder in the centre of the scale field of the exposure meter which is not shown in detail in this FIG. 4.

FIG. 3 shows the known elements of a reflex camera, such as the objective 9, the pivoting mirror 10 and the ground glass screen magnifier 11. The image formed on the ground glass screen magnifier 11 by the action of the objective 9 is presented to the eye in an erected and laterally correct form by means of a penta roof-edge prism 12 and an eyepiece 13. The penta roof-edge prism 12 and the eyepiece 13 are mounted in a housing 14 which is adapted to be attached to the camera. The housing 14 containing the penta-roof prism 12 has a protruding ledge 2''' on either side for holding it in place in corresponding grooves in the camera top 2. The housing 14 with the prism 12 and the attached eye-piece 13 may be interchanged with a light-conducting shaft 2', as shown in dash-dotted lines 2'–2''–2''' in FIG. 1. Thus the camera might be equipped either with the more expensive penta roof-edge prism or with the inexpensive light-conducting shaft whereby these parts can be interchanged at will. However, in both cases the exposure meter needle 3' can be readily observed.

The limitation of the eyepiece opening for the viewfinder system is effected at three sides by means of the edges 15, 16 and 17. On the fourth side facing the exposure meter the edge 18 of a prism 19 forms the lateral limit for the viewfinder eyepiece. The prism 19 and its two reflecting surfaces 20 and 21 may also be replaced by two individual surface mirrors (see FIG. 6).

The center axis of the reflecting surface 21 is extended towards the exposure meter side of the camera in a pocket-like widening of the viewfinder housing 14 so that it coincides substantially with the centre axis of the scale field 3 and of the mirror 4 and the opening 6.

Figure 5:
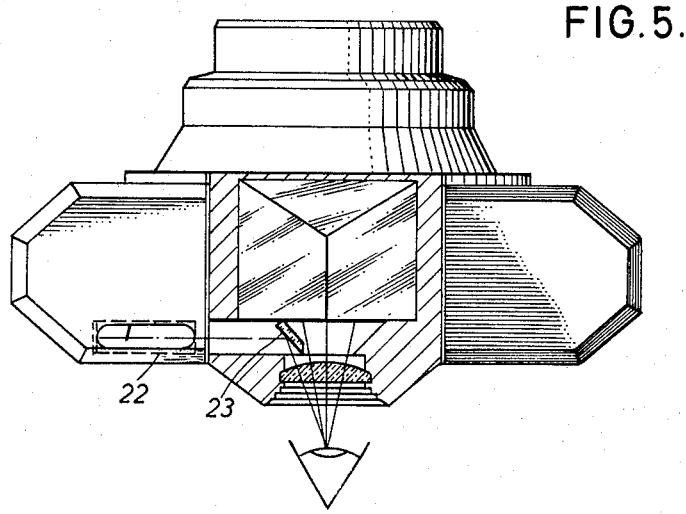
FIGS. 5 and 6 show other possible embodiments of the invention in a view similar to FIG. 2.
Figure 6:
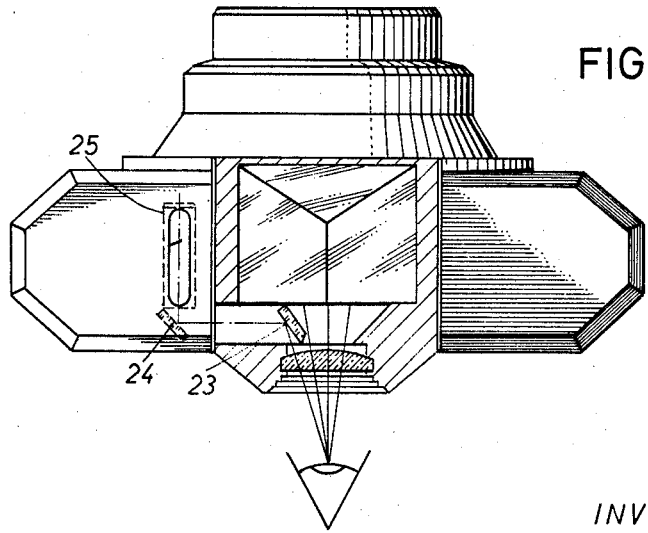

Another arrangement of the reflector surfaces 20 and 21 is shown in FIGS. 5 and 6, wherein one reflecting mirror 23 may be placed inside the interchangeable housing near the eyepiece. The other reflector 24 is in this case located inside the camera top 2, and corresponding reflectors 22, 25, respectively, are likewise placed permanently in the camera top. The arrangement shown in FIG. 5 thus would require only two mirrors, whereas the embodiment shown in FIG. 6 uses three mirrors.

The mode of operation of the arrangements shown in FIGS. 1 to 6 is as follows:

If the user looks through the eyepiece lens 13 and the opening formed by the boundaries 15, 16, 17 and the side 18 of the mirror or prism, and through the penta roof-edge prism 12, then in known manner he sees on the ground glass surface of the magnifier 11 an erected laterally correct image projected by the objective 9. At the same time, in consequence of the reflecting surfaces 20 and 21 and the mirror 4, he also sees the position of the exposure meter needle 3', with the associated scale and mark or follow-up needle. This arrangement also gives the advantage that appropriate positioning of the reflector surface 20 can cause the exposure meter indication to be situated apparently both in the viewfinder field itself and next to said field to any desired degree.

Figure 2:
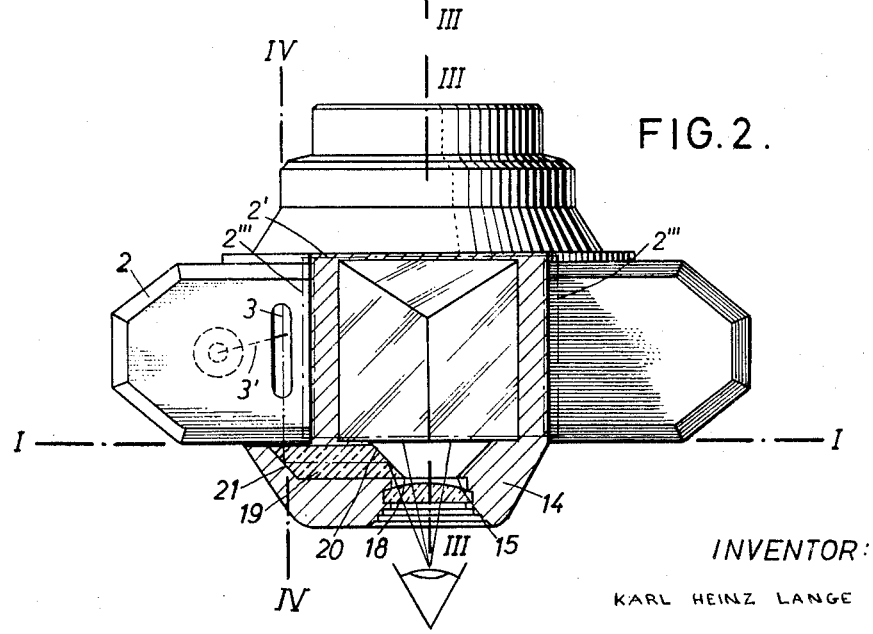
FIG. 2 is a plan view of the camera with the prism viewfinder inserted, the housing of the viewfinder being shown in section on the line II—II in FIG. 3.

The lens 5 may be dispensed with if the camera design enables the path of the exposure meter needle to be placed in the same optical plane as the ground glass screen of the viewfinder. This arrangement particularly enables a camera which is to be delivered with a conventional open light-conducting shaft 2' to be kept extremely inexpensive and yet, when the prism viewfinder is purchased subsequently, the advantages of reflection of the exposure meter indication into the viewfinder image can be fully enjoyed, the expense for this being incurred only when the viewfinder is purchased, since the expensive parts of the arrangement (the prism 19) are disposed in the viewfinder housing. As shown in FIG. 6, the camera body 2 may be originally equipped with a mirror 24 and with a conventional light-conducting shaft 2', such as shown in FIGS. 1 and 2, which is mounted on a frame having the same ledges 2''', also shown in FIGS. 1 and 2, and the contours 2'', as seen in FIGS. 1 and 2, as the penta-prism housing 14. This mirror 24 is only used when this penta-prism housing is inserted in lieu of the light-conducting shaft frame, while the corresponding mirror 23 is arranged in the penta-prism housing. Thus, the versatility of this structure is considerable, since the costly penta-prism viewfinder can be added at a later date without any change in the camera, by merely sliding the light-conducting shaft frame out and by inserting instead the penta-prism viewfinder in the same place. The principal feature of having the image of the exposure meter pointer in the same eyepiece, but outside of the viewfinder image, has been heretofore explained.

What I claim is:

1. In a reflex camera having a first housing, a window in said first housing, an exposure meter located beneath said window in said first housing, said exposure meter having a movable pointer and a scale thereon; the combination with an inverting penta-roof-prism viewfinder having an eyepiece encompassing the viewfield thereof, said prism viewfinder being enclosed in a second housing located in said first housing, said second housing and said prism viewfinder constituting a removable unit structure being arranged to be interchanged with a conventional, open light-conducting shaft forming a viewing hood, of first reflecting means disposed in said second housing laterally adjacent said viewfinder between the rear face of said penta-roof-prism and the aperture of said eyepiece, said first reflecting means optically presenting an independent narrow elongated image area laterally adjacent said viewfield in said eyepiece, said first means having a reflecting surface arranged at an angle of approximately 45° to said viewfinder eyepiece axis, the inner edge thereof extending into and abutting the lateral portion of said viewfinder aperture, said first means reflecting the image of said pointer and of said scale of said exposure meter into said narrow elongated area laterally adjacent said viewfield in said eyepiece, and second reflecting means in said second housing arranged parallel to said reflecting surface of said first means, said second reflecting means transmitting said image of said pointer and of said scale to said first reflecting means.

2. In a reflex camera according to claim 1, said first and said second reflecting means being faces of a reflecting prism.

3. In a reflex camera having a housing, a window in said housing, an exposure meter located beneath said window in said housing, said exposure meter having a movable pointer and a scale thereon; the combination with an inverting penta-roof-prism viewfinder having an eyepiece encompassing the viewfield of same, of a pair of parallel mirrors being separately arranged laterally adjacent said view finder at an angle of approximately 45° to said viewfinder eyepiece axis, said mirrors optically presenting an independent elongated narrow image area on one side of said viewfield in said eyepiece, the first one of said mirrors forming one side of said viewfield, the inner edge of said first mirror extending into and abutting the lateral portion of said viewfinder eyepiece and being located between the rear face of said inverting penta-roof-prism and said viewfinder eyepiece, a separate housing enclosing said inverting prism viewfinder and said first one of said mirrors, the second one of said mirrors being located in the camera housing, said separate housing constituting a removable unit structure having protruding ledge means on two parallel sides thereof, said unit structure being arranged to be interchanged with a conventional, open light-conducting shaft forming a viewing hood.

References Cited by the Examiner

UNITED STATES PATENTS

| 2,197,939 | 4/1940 | Leitz | 95—10 |
| 2,242,043 | 5/1941 | Sanger et al. | 88—1.5 X |
| 2,784,654 | 3/1957 | Meyer. | |
| 2,933,991 | 4/1960 | Sauer. | |
| 2,975,685 | 3/1961 | Fegert | 88—1.5 X |
| 2,975,687 | 3/1961 | Gregor. | |
| 2,994,257 | 8/1961 | Papke | 88—1.5 X |

FOREIGN PATENTS

| 1,235,779 | 5/1960 | France. |
| 547,045 | 8/1942 | Great Britain. |

DAVID H. RUBIN, *Primary Examiner.*

EMIL G. ANDERSON, *Examiner.*